United States Patent [19]

Sommer

[11] Patent Number: 4,598,804

[45] Date of Patent: Jul. 8, 1986

[54] MOTOR DRIVE SYSTEM

[75] Inventor: Gordon M. Sommer, Boca Raton, Fla.

[73] Assignee: Sommer Co., Warren, Mich.

[21] Appl. No.: 583,349

[22] Filed: Feb. 24, 1984

[51] Int. Cl.$^4$ ............................................... B60K 41/02
[52] U.S. Cl. .................... 192/0.02 R; 192/34; 192/70.12; 192/70.24; 192/99 A
[58] Field of Search ............... 192/0.02 R, 34, 70.12, 192/70.24, 70.3, 84 R, 99 A, 112, 113 B

[56] References Cited

U.S. PATENT DOCUMENTS

| 2,753,023 | 7/1956 | Marvin | 192/84 R |
| 3,089,574 | 5/1963 | Howard | 192/99 A |
| 3,713,517 | 1/1973 | Sommer | 192/113 B X |

FOREIGN PATENT DOCUMENTS 544695  2/1956  France ........................... 192/99 A Primary Examiner—George H. Krizmanich
Attorney, Agent, or Firm—Harness, Dickey & Pierce

[57] ABSTRACT

A motor drive system comprising an electric motor having a first drive shaft moveable axially in response to commencement or cessation of operation of the motor and an oil shear clutch operably associated with said motor and having a second drive shaft extending therefrom, the clutch engaging the first and second drive shafts in response to axial movement of the first drive shaft at commencement of operation of the motor and disengaging the first and second drive shafts in response to axial movement of said first drive shaft at cessation of operation of said motor.

6 Claims, 2 Drawing Figures

MOTOR DRIVE SYSTEM

BACKGROUND AND SUMMARY OF THE INVENTION

This invention relates generally to motor drive systems and, more particularly, to a new and improved oil-cooled clutch unit adapted particularly, although not necessarily, for use in operative association with punch presses and the like, such as that disclosed in applicant's U.S. Pat. No. 3,614,999, issued Oct. 26, 1971.

It is accordingly a general object of the present invention to provide a new and improved motor drive system. It is a more particular object of the present invention to provide a new and improved clutch unit utilizing an oil shear clutch in combination with an electic drive motor which incorporates the feature of axial movement of its drive shaft at commencement of operation of the motor and at cessation of operation of the motor. Such motors are conventional and generally have direct frictional engagement of an annular clutch which clutch has a relatively short life span and needs substantial adjustments in order to maintain consistent drive characteristics.

The present invention uses the shaft motion of the electric motor and adapts it to wet clutches to extend the life of the motor and clutch significantly while also requiring little, if any, adjustments to maintain consistent drive characteristics at the output of the clutch. It is a further object of the present invention to utilize the axial movement of the drive shaft of the electric motor in as compact an apparatus as possible while amplifying the movement of the drive shaft to properly engage a wet clutch in a positive functional manner.

Further important objects of the present invention are to provide a new and improved clutch unit which is simple in design, economical to manufacture and operate, extremely rugged, requiring little maintenance during operation, and where the output shaft is readily adapted for mounting to a number of associated machines, a gear, sheaves, etc.

Other objects and advantages of the present invention will become apparent from the following detailed description taken in conjunction with the accompanying drawings.

DETAILED DESCRIPTION OF THE PREFERRED EMBODIMENTS

Figures 1, 2:
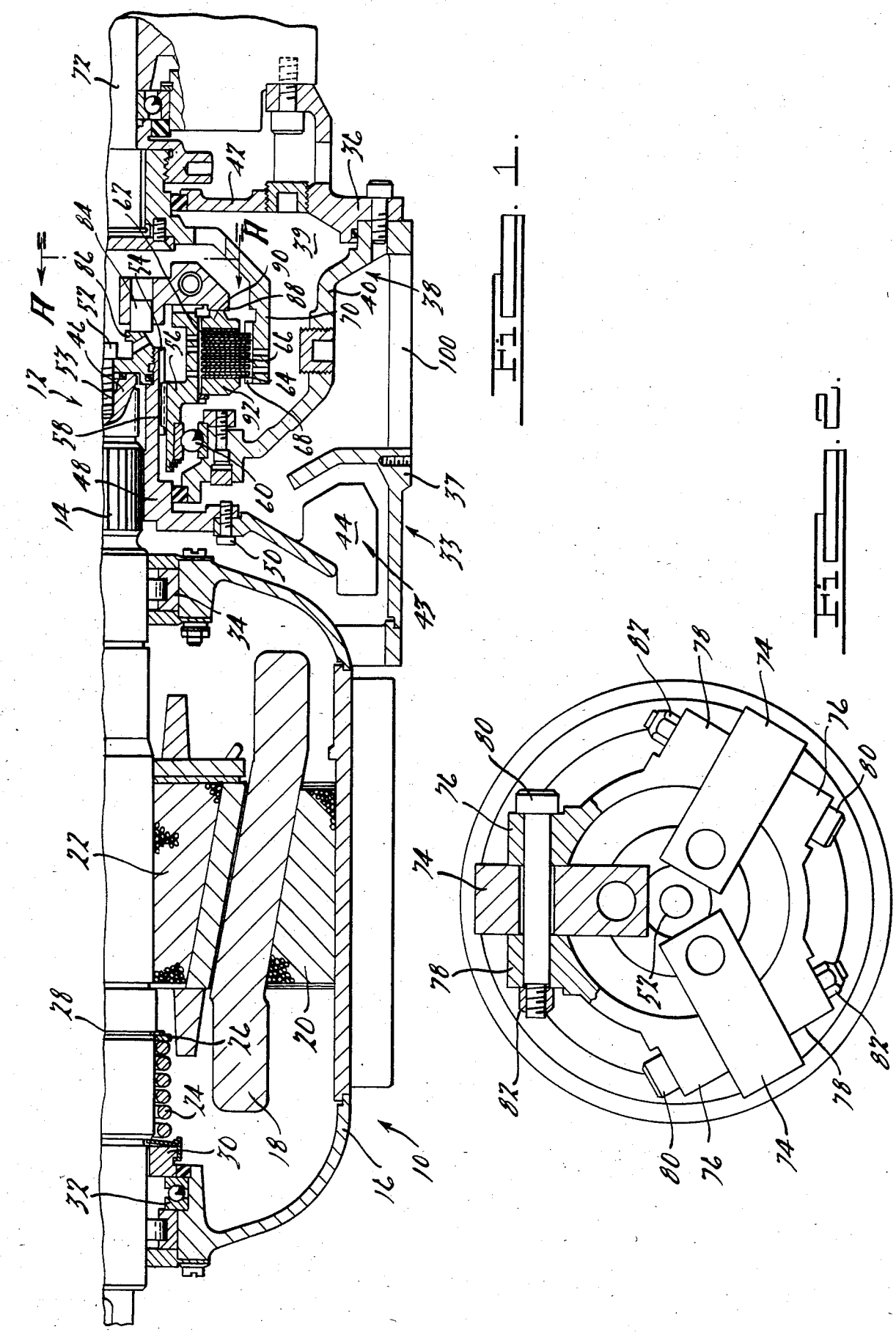
FIG. 1 is a side-sectional view of the bottom half of a motor and clutch unit of the present invention.
FIG. 2 is a sectional view taken along the line A—A of FIG. 1 and including the upper half of the clutch unit at that point.

Generally speaking, the clutch-brake unit of the motor drive system of the present invention is an improvement over that disclosed in applicant's U.S. Pat. No. 3,614,999, issued Oct. 26, 1971, and incorporated by reference herein. Referring in detail to the drawings and in particular in FIG. 1, the motor drive system comprises an electric motor 10 operably associated with a clutch unit 12 at the drive shaft 14 of the motor 10. The electric motor 10 is of the type where the motor shaft 14 acts to energize a clutch as sold under the trade name "DeMag Transfer Drive" by Manne Smann DeMag Corporation of West Germany. The electric motor 10 itself is comprised of external housing 16 within which is disposed an electrically energized rotatable member 18 having windings 20 surrounding it and an internal rotatable member 22 fixed to the drive shaft 14 of the motor 10. A coil spring 24 connected on one end to annular ring 26 disposed within a groove 28 on the drive shaft and connected to an interior housing portion 30 at its opposite extreme biases the shaft 14 to the left as shown in FIG. 1, away from the clutch unit 12. The shaft 14 rides in suitable bearings 32 and 34 within the housing 16. The clutch unit 12 includes an external annular housing 33 comprised of an external end wall 36 and an annular outer housing section 37 at the outer periphery thereof.

Within the housing 33 formed by wall 36 and section 37 is an interior housing 38 forming an oil chamber 39, which housing 38 is comprised of a substantially annular section 40 and an end wall 42.

The drive shaft 14 of the motor 10 has a fan 43 comprised of blades 44 connected at the end 46 of the shaft 14 disposed within the outer housing 33. The fan 43 is secured to an annular sleeve 48 by suitable bolt securing means 50. The sleeve 48 is secured to the drive shaft 14 also by a suitable securing bolt 52 threaded into a threaded bore 53 at the end 46 of the shaft 14. The outer periphery of the sleeve 48 includes a series of circumferentially spaced splines 54. Surrounding the sleeve 48 is an annular member 56 which has at its inner periphery thereof a series of circumferentially spaced splines 58 which engage the splines 54 of the outer periphery of the sleeve 48 so that slideable axial movement between the two sleeves may be accomplished while also providing engagement between the splines 54 and 58 to have the member 56 driven by the sleeve 48 via rotation of the motor drive shaft 14. The annular sleeve 56 is associated with the interior housing wall 40 by a suitable ball bearing 60. The annular sleeve 56 at its outer periphery thereof has a second set of circumferentially spaced splines 62 upon which a series of discs 64 can be disposed to permit relative axial movement but limit circumferential movement of the discs 64. Plates 66 are interweaved with the discs 64 and operably associated at their outer extremes with splines 68 disposed on an axially widened annular portion 70 of the output shaft 72 of the unit 12.

Referring to both FIGS. 1 and 2, the annular sleeve 56 is also a carrier for three pivoted transferring members 74 engaged with three pairs of flanges 76, 78 circumferentially spaced about the circumference of the annular sleeve 56. The pivoted transferring members 74 are pivotally secured to the flanges 76, 78 by bolts 80 and nuts 82, respectively.

The pivoted transferring members 74 comprise an interior abutment portion 84 which contacts an extended annular portion 86 of the interior sleeve 56 which extended portion 86 moves axially with the movement of the drive shaft 14 of the electric motor 10. Due to the secured pivot point of the pivoted transferring member 74, a second abutment portion 88 at the opposite end of each pivoted transferring member 74 will engage an annular transfer member 90. The transfer member 90 abuts the stack of interweaved discs 64 and plates 66. When moved in an axial direction by the second abutment portions 88 of the pivoted transferring members 74, the annular transfer member 90 forces the discs 64 and plates 66 together against an annular stop 92 fixedly associated with the sleeve 56 at the other end of the stack. Thus, movement of the drive shaft 14 of the electric motor 10 in a direction to the right as shown in FIG. 1 moves the second abutment portions 88 of the toggle members 74 against the annular transfer member 90 to the left and engages the stack thereby engaging the drive shaft 14 with the output shaft 72.

In operation, once the electric motor 10 is energized, the drive shaft 14 will move approximately three millimeters to the right, as shown in FIG. 1, with a force of approximately 220 pounds. This force will remain constant throughout the operation of the motor 10 and will force engagement of the clutch 12 at the stack of discs 64 and plates 66 to transfer power from the drive shaft 14 of the motor 10 to the output shaft 72 of the clutch 12. Once the motor 10 is turned off, the drive shaft 14 will move to the left three millimeters via the spring 24 and disengage the clutch 12 by pivotal movement of the pivoted transferring members 74 in a counterclockwise direction as shown in FIG. 1. At this point, the output shaft 72 is disengaged from the drive shaft 14 and the driven machine is no longer powered by the motor 10.

Throughout operation of the motor 10, the fan blades 44 cool the motor 10 by pulling air through passages 100 in the outer housing 33 of the clutch unit 12. Although only one such passage is shown in FIG. 1, it is anticipated that a plurality of such passages, such as four in number, will be circumferentially spaced around the housing, and through which the fan 43 will pull air through the clutch unit 12 to cool the clutch unit 12 and also force air past the motor 10 to cool the motor 10. It is anticipated that blocking off all but one of the passages 100 and attaching a blower unit to the remaining passage 100 will further effectuate the cooling process if necessary.

Although it is apparent that the preferred embodiment of the present invention is well calculated to provide the features and advantages stated above, it will be appreciated that the invention is susceptible to modification, variation, and change without departing from the proper scope or fair meaning of the appended claims.

I claim:

1. A motor drive system comprising:
electric motor means having a first drive shaft and having means for axial movement of said first drive shaft of said motor means upon commencement of operation of said motor means; and
a clutch unit comprising,
   a housing assembly comprising at least one end wall and an annular enclosure member extending from and attached to said at least one end wall, said housing assembly forming a reservoir chamber around the portion of said first drive shaft of said motor means;
   a driven shaft extending from interior of said housing assembly to exterior of said housing assembly;
   clutch means comprising a plurality of clutch plates rotatable with said driven shaft and a plurality of clutch discs rotatable with said first drive shaft interweaved with said plurality of plates; and
   means responsive to axial movement of said first drive shaft upon commencement of operation of said electric motor means for engaging said discs and plates together to operably associate said driven shaft of said clutch unit with said first drive shaft of said motor means, comprising a fixed element disposed at one axial extreme of said plates and discs, an axially moveable element disposed at the axially opposite extreme of said plates and discs, and means for amplifying the axial movement of said first drive shaft comprising at least one pivoted member having a first portion in operable association with said first drive shaft and a second portion in operable association with said axially moveable element of said engaging means wherein said pivoted member is pivotally responsive to axial movement of said first drive shaft, wherein said pivoted member acts against said moveable element to engage said disc and plates together against said fixed element.

2. A motor drive system comprising:
electric motor means having a first drive shaft and having means for axial movement of said first drive shaft of said motor means upon commencement of operation of said motor means; and
a clutch unit comprising,
   a housing assembly comprising at least one end wall and an annular enclosure member extending from and attached to said at least one end wall, said housing assembly forming a reservoir chamber around the portion of said first drive shaft of said motor means;
   a driven shaft extending from interior of said housing assembly to exterior of said housing assembly;
   clutch means comprising a plurality of clutch plates rotatable with said driven shaft and a plurality of clutch discs rotatable with said first drive shaft interweaved with said plurality of plates; and
   means responsive to axial movement of said first drive shaft upon commencement of operation of said electric motor means for engaging said discs and plates together to operably associate said second drive shaft of said clutch unit with said first drive shaft of said motor means, including pivoted means for transferring said movement of said first drive shaft to said clutch means.

3. The system of claim 2, wherein said pivoted transferring means comprises at least one pivoted member having a first portion in operable association with said first drive shaft and a second portion in operable association with said axially moveable element of said engaging means wherein said pivoted member is pivotally responsive to axial movement of said first drive shaft.

4. The system of claim 2, wherein said pivoted transferring means comprises at least one pivoted member having one end in operable association with one end of said first drive shaft.

5. The system of claim 2, wherein said pivoted transferring means is disposed in operable association with and is rotateable with said first drive shaft.

6. The system of claim 2, wherein said means for engaging further comprises means for disengaging said clutch means in response to axial movement of said first drive shaft upon cessation of operation of said motor means.

* * * * *